US012688240B1

(12) United States Patent
Cui et al.

(10) Patent No.:     US 12,688,240 B1
(45) Date of Patent:          Jul. 21, 2026

(54) COMPUTATIONALLY EFFICIENT SEARCH FILTER

(71) Applicant: Intuit Inc., Mountain View, CA (US)

(72) Inventors: Sophia Cui, Mountain View, CA (US); Aashish Dhamdhere, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/417,144

(22) Filed: Dec. 11, 2025

(51) Int. Cl.
     *G06F 16/903*          (2019.01)
(52) U.S. Cl.
     CPC .............................. *G06F 16/90344* (2019.01)
(58) Field of Classification Search
     None
     See application file for complete search history.

(56)          References Cited

U.S. PATENT DOCUMENTS

| | | | |
|---|---|---|---|
| 11,916,767 B1 * | 2/2024 | Wu ......................... | G06F 16/33 |
| 12,393,620 B1 * | 8/2025 | Khanwalkar ....... | G06F 16/3329 |
| 2023/0132670 A1 * | 5/2023 | Kalamkar .............. | G06F 16/35 |
| | | | 706/14 |
| 2024/0386331 A1 * | 11/2024 | Yu .......................... | G06F 16/90 |
| 2025/0272337 A1 * | 8/2025 | Mishra .............. | G06F 16/90332 |

* cited by examiner

*Primary Examiner* — Son T Hoang
(74) *Attorney, Agent, or Firm* — Lathrop GPM LLP

(57)          ABSTRACT

A method including receiving a number of results to a query. The method also includes interweaving execution of regular expressions and prompts on the number of results. Interweaving removes negative results from the number of results. Interweaving continues until a stop condition is satisfied. Interweaving generates, after the stop condition is satisfied, final results including a subset of the number of results including positive results to the query. The regular expressions are executed by a processor. The prompts are executed by a language model being executed by the processor. The method also includes returning the final results.

20 Claims, 5 Drawing Sheets

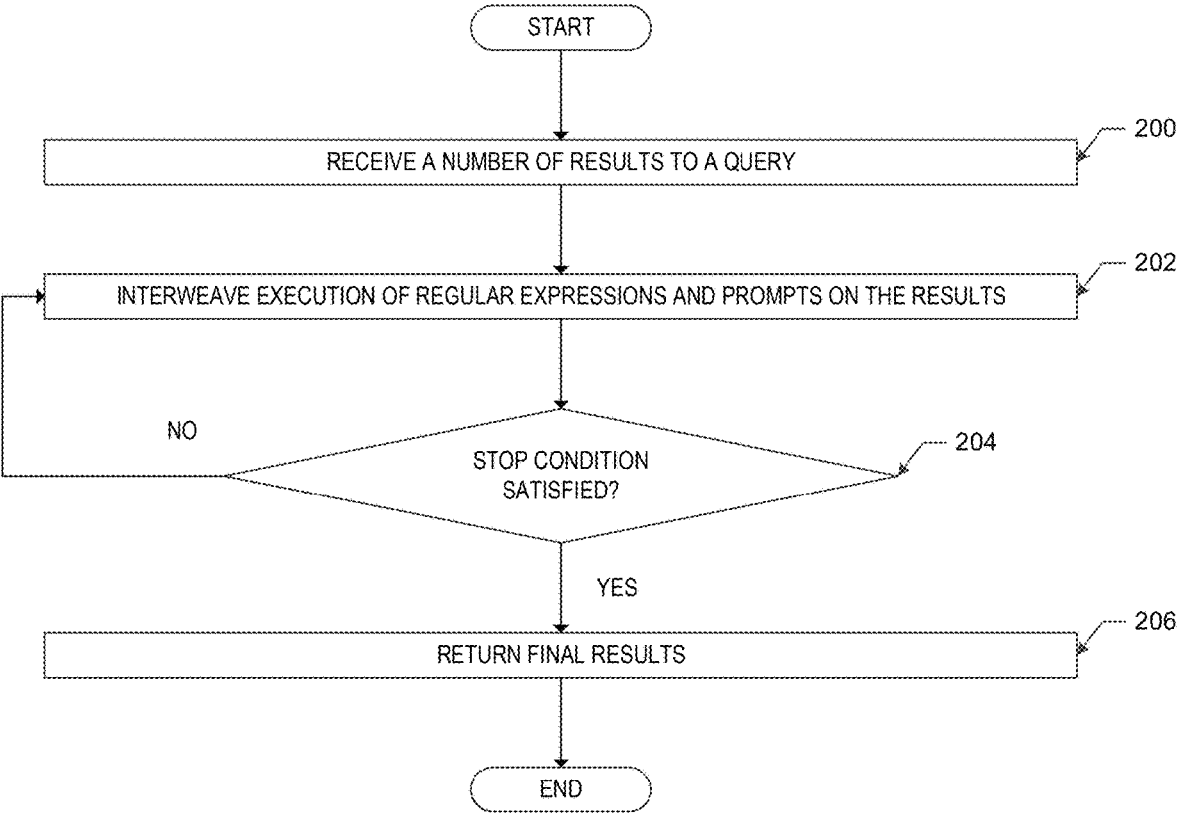
_FIG. 2_

500
COMPUTING
SYSTEM

COMPUTATIONALLY EFFICIENT SEARCH FILTER

BACKGROUND

Modern computer search engines may be powerful, able to filter irrelevant results from streams of data. For example, a large language model (e.g., CHATGPT® by OpenAI) may be able to sort through data streams of information to find documents that are relevant to a complex query (high precision), possibly without disregarding relevant documents (high recall).

However, such search engines, particularly large language models, use a significant amount of physical computational resources (e.g., processor cycles, communication bandwidth, etc.) to execute such searches. As a result, such systems may exhibit high latency (i.e., take too long, from the perspective of a user, to return an answer). Furthermore, such intensive use of physical computational resources may translate into absolute dollars by way of providing for additional equipment, such as faster processors and such as other components, electrical power usage, etc.

Thus, a technical problem is presented. The technical problem is returning high precision, high recall returns in response to a query, but at an increased computational efficiency relative to search techniques that rely on large language models or other search tools that use a similar amount of physical computational resources to execute.

SUMMARY

One or more embodiments provide for a method. The method includes receiving a number of results to a query. The method also includes interweaving execution of regular expressions and prompts on the number of results. Interweaving removes negative results from the number of results. Interweaving continues until a stop condition is satisfied. Interweaving generates, after the stop condition is satisfied, final results that include a subset of the number of results including positive results to the query. The regular expressions are executed by a processor. The prompts are executed by a language model being executed by the processor. The method also includes returning the final results.

One or more embodiments also provide for a system. The system includes a computer processor and a data repository in communication with the computer processor. The data repository stores a number of results to a query, including negative results, positive results, and final results that include a subset of the number of results including the positive results to the query. The data repository also stores regular expressions, prompts, and a stop condition. The system also includes a language model executable by the computer processor to execute the prompts. The system also includes a server controller executable by the computer processor to receive the number of results to the query. The server controller is also executable by the computer processor to interweave execution of the regular expressions and the prompts on the number of results. Interweaving removes the negative results from the number of results. Interweaving continues until the stop condition is satisfied. Interweaving generates, after the stop condition is satisfied, the final results. The regular expressions are executed by the computer processor. The prompts are executed by the language model. The server controller is also executable by the computer processor to return the final results.

One or more embodiments provide for another method. The method includes processing a query on a number of data sources to return a number of results. The method also includes generating, using the query and a number of regular expression templates, a number of regular expressions. Each of the number of regular expression templates includes a regular expression noise tag and a regular expression recall tag. The method also includes generating, using the query and a number of prompt templates, a number of prompts. Each of the number of prompt templates includes a prompt noise tag and a prompt recall tag. The method also includes processing an initial subset of the number of regular expressions to the number of results to generate a reduced number of results. The initial subset includes the regular expression recall tag being recall safe. The method also includes determining, after applying the initial subset and from the regular expression noise tag of the initial subset of the number of regular expressions, an initial estimated noise in the reduced number of results. The method also includes selecting a selected regular expression from the number of regular expressions. The selected regular expression is outside the initial subset. The regular expression noise tag for the selected regular expression includes a higher permitted noise than the regular expression noise tag in the initial subset. The regular expression recall tag for the selected regular expression is less than recall safe. The method also includes processing the selected regular expression on the reduced number of results to generate rejected results that are rejected from the reduced number of results. The method also includes determining, after processing the selected regular expression and from the regular expression noise tag of the selected regular expression and the initial estimated noise, a reduced estimated noise. The method also includes processing a selected prompt from the number of prompts on the rejected results to generate recalled results representing true positive results in the rejected results. The method also includes determining, from the recalled results and the reduced estimated noise, a coverage of the reduced number of results. The method also includes processing, responsive to the coverage failing to satisfy a coverage threshold and from the number of prompts, a recall prompt on the rejected results to generate recalled results. The method also includes combining the reduced number of results, the rejected results, and the recalled results to generate adjusted results. The method also includes iterating, responsive to the reduced estimated noise failing to satisfy a noise threshold, selecting the selected regular expression, processing the selected regular expression, determining the reduced estimated noise, processing the selected prompt, determining the coverage, processing the recall prompt, and combining. Iterating terminates when the reduced estimated noise satisfies the noise threshold, and wherein iterating generates final results upon termination of iterating. The method also includes returning the final results.

Other aspects of one or more embodiments will be apparent from the following description and the appended claims.

BRIEF DESCRIPTION OF DRAWINGS

FIG. 2 and FIG. 3 show flowcharts of methods for a computationally efficient search filter, in accordance with one or more embodiments.

Like elements in the various figures are denoted by like reference numerals for consistency.

DETAILED DESCRIPTION

Figure 1:
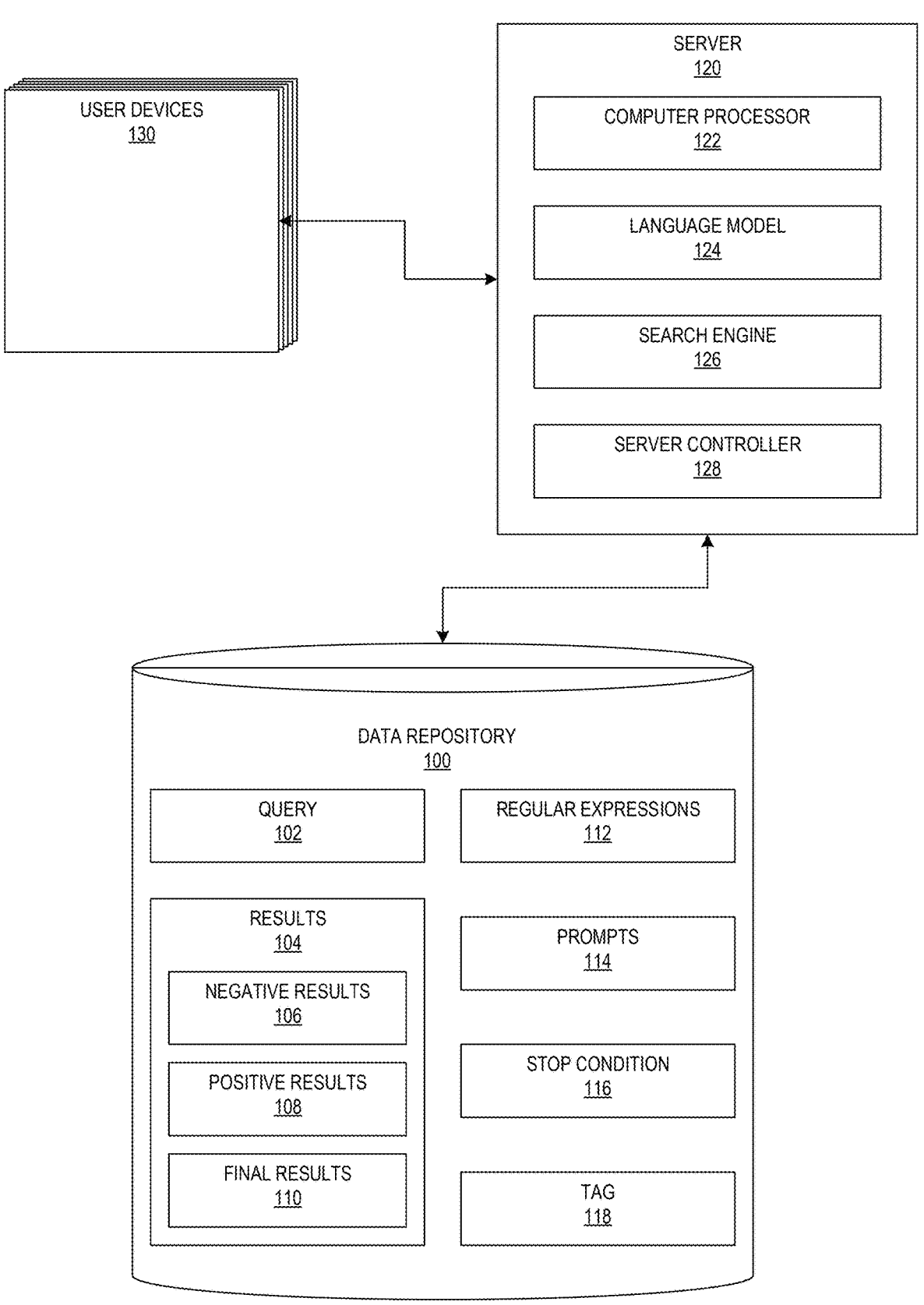
FIG. 1 shows a computing system for a computationally efficient search filter, in accordance with one or more embodiments.

One or more embodiments are directed to technical solutions for the technical problem of returning high precision, high recall returns in response to a query, but at an increased computational efficiency relative to search techniques that rely on large language models or other search tools that use a similar amount of physical computational resources to execute. The technical problem arises often in the context of filtering results to a query. For example, a query may return 10,000 or more results. However, a user likely is only interested in the top 10 or 20 results, or less.

While a large language model is excellent at filtering query results with a high degree of precision, the large number of tokens that the large language model processes to filter such a volume of results is physically computationally expensive, as described above. On the other hand, regular expressions ("regexes," or "regex" in the singular) are computationally highly efficient. However, regexes are often not precise. For regexes may fail to filter enough true negatives (i.e., results that are not actually relevant to the query). Regexes also may filter a certain percentage of true positives (i.e., results which are actually relevant to the query, but which a regex for some reason filters from the pool of results). Thus, currently, users are faced with a dilemma. Users may either achieve high precision by executing a computationally expensive large language model, or achieve computational efficiency executing one or more computationally inexpensive regexes with the knowledge that the results may contain true negatives and fail to contain true positives.

One or more embodiments solve the above-described technical problem and resolve the above-described dilemma by providing for computationally efficient, high precision filtering of query results. Briefly, the technical solutions involve implementing a recursive hybrid pipeline that alternates between executing regexes and a language model on task-specific micro prompts.

Generally, a prompt is a command to a language model to execute a function. A micro prompt is a prompt that commands a language model to output a single result in the form of a limited number of tokens. An example of a micro prompt is a prompt that commands the language model to check whether a result contains one of a list of terms, and also commands the language model to output a single token (i.e., a "yes," or a "no."). Thus, micro prompts output few tokens, relative to broader large language model commands, and may also contain limits on the number of input tokens permitted to be used in the micro prompt. In an embodiment, the language model may be a large language model, but also may be a more limited-purpose language model that is more computationally efficient than the large language model. When a large language model executes a micro prompt, the execution is still computationally efficient (as defined above and below) because the micro prompt requests only simple outputs (e.g., a single yes/no token). Furthermore, micro prompts are substantially model-resistant and can be executed on smaller or less expensive language models without materially degrading accuracy.

The procedures described herein progressively filter results or some other data stream. Each iteration uses observed values of residual noise and coverage to decide (i) whether another pass is to be executed, and (ii) which filters to apply next (e.g., a regex, a specialized prompt, or both).

The filtered list of results includes those items that pass the combined effects of the regexes and large language model micro prompts. Each item in the filtered list of results may be assigned a calibrated probabilistic confidence score. The regexes and large language model micro prompts are computationally very efficient. However, the regexes and large language model micro prompts may carry a risk of excluding true positives.

Therefore, at certain stages during the process (as described below), a full large language model may be executed on a small number of rejected results when a particular regex or large language model micro prompt (when executed) carries a predetermined risk of excluding true positive results. A full large language model is a large language model that has at least about a billion parameters in the neural network of the model. The full large language model may determine that certain rejected results are true positives, and the true positives may be added back into the current pool of results. However, because the full language model executes on a small number of results (i.e., the relatively few results rejected in a particular pass of the algorithm described below, compared to the total number of results being filtered), the overall process remains computationally efficient. Nevertheless, the full large language model helps prevent true positives from being excluded from the current pool of results. Use of the full large language model in this manner may be referred to as a recall pass.

Thus, one or more embodiments may achieve greater than 90% precision for large volume data filtering (e.g., two dozen enterprise deployments across hundreds of data streams). However, one or more embodiments may remain highly efficient in terms of computational efficiency, relative to using a full large language model to filter the initial set of results.

Therefore, briefly, one or more embodiments provide for a data filtering technique that achieves high computational efficiency, relative to executing a full large language model. One or more embodiments also achieve a high degree of precision (i.e., one or more embodiments returns relevant results while excluding few or no true positive results). One or more embodiments achieve the above-described benefits by interweaving the execution of regexes, language model micro prompts, and (if called-for in the algorithm) full large language models on relatively small sets of rejected results to identify true positive results and return the true positive results back into the pool of results.

One or more embodiments also may be described as providing a recursive hybrid pipeline which alternates execution of regexes and specialized language model micro prompts. One or more embodiments may use a decision policy driven by measured residual noise, coverage, and cost and latency constraints to decide which regex, micro prompt, or recall pass to execute. One or more embodiments provide for context-injected prompting (e.g., to identify the title, uniform resource link (URL), snippet, expected entity, etc., in results) and task specific prompt families (e.g., to perform entity verification, sense disambiguation, attribution, role or event validation, etc.) to further limit the pool of results while maintaining computational efficiency. One or more embodiments may monitor attribution-aware metrics per pass (e.g., how much noise each regex or language model micro prompt removes) and stage dashboards that guide recursion. One or more embodiments also provide for calibrated, per-result confidence scoring derived from multi-signal features and fitted to labeled ground truth, thereby producing interpretable probabilities of filtering precision. One or more embodiments also provide for an automated false positive learning loop that updates rules and micro prompt selection. One or more embodiments also provide for a cost-aware determination of when to terminate the filtering process. The determination of when to terminate may balance accuracy with compute spend and latency. One or more embodiments also provide for a schema and audit trail that support reproducibility (e.g., the identities of prompts, passes, rule versions, status, etc.).

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores one or more queries, such as query (102). The query (102) is a computer readable request for information submitted to the search engine (126) (defined below). For example, the query (102) may request that information regarding a subject be returned to one or more user devices (130).

The data repository (100) also stores results (104). The results (104) are two or more results returned by the search engine (126) in response to executing the query (102). In practical applications, the results (104) may include tens of thousands of results, to millions of results, or more. Each result may be, for example, an answer to a question posed in the query (102), a document returned in response to the query (102), websites or hyperlinks returned in response to the query (102), etc.

The results (104) may include negative results (106). The negative results (106) are those results in the results (104) that do not answer the query (102) or which fail to satisfy a relevance threshold. For example, a machine learning model (e.g., a semantic distance machine learning model) may determine a numeric estimation of the semantic distance between the query (102) and each of the results (104). Those results of the results (104) which fail to have a semantic distance that satisfies the relevance threshold may be discarded as being among the negative results (106).

The results (104) also include positive results (108). In contrast to the negative results (106), the positive results (108) are those results in the results (104) that do answer the query (102) or which satisfy the relevance threshold described above.

The results (104) also include final results (110). The final results (110) are those results in the results (104) that remain after the filtering process of one or more embodiments has been completed (e.g., after the method of FIG. 2, after the method of FIG. 3, or after the data flow of FIG. 4). Thus, the final results (110) also may be referred to as filtered results.

One or more embodiments further contemplate that the results (104) may include a pool of current results. The pool of current results is a subset of the results (104) that is subject to being filtered (i.e., the results (104) or those results in the results (104) that remain after some, but not all filtering, of one or more embodiments has been performed). Thus, for example, the pool of current results is those results of the results (104) that remain at a given point in time during the execution of the method of FIG. 2, the method of FIG. 3, or the method of FIG. 4.

The data repository (100) also stores a number of regular expressions (112). The regular expressions (112) are non-machine learning programs or scripts which the computer processor (122) (defined below) can execute in order to perform a function. In an embodiment, the regular expressions (112) represent filtering programs which remove results based on some deterministic, computer-implemented code (e.g., computer executable code that is programed to strip those results in the results (104) that do not contain the word "gizmo").

The regular expressions (112) also may be referred to as a regex (in the singular) or regexes (in the plural). Regexes are computationally highly efficient, relative to language models (or many other types of machine learning models). Unlike language models or some other types of machine learning models, which may contain thousands, millions, or billions of parameters that a computer processor (122) will execute, the regular expressions (112) use relatively simple, direct processing techniques. Thus, in many cases, regexes use a trivial amount of computational resources to execute, relative to the resources used by a large language model to execute a complex prompt.

The data repository (100) also stores a number of prompts (114). A prompt (and thus each of the prompts (114)) is a command, expressed in natural language, which instructs a language model (e.g., the language model (124) defined below) to execute a function. The prompts (114) may include limitations or conditions that the language model (124) is to follow when executing the command in the prompts (114).

Thus, each of the prompts (114) may be applied to a portion of the results (104) (e.g., the current pool of results) and may include a command to check that portion against a standard. Each of the prompts (114) also may require that the language model (124) return a single answer token (e.g., a single word selected from a group of predefined words).

Prompts which limit the number of output tokens, and which command the language model (124) to execute a well-defined function, may be referred to as "micro prompts." In other words, a "micro prompt" is one or more of the prompts (114) which command the language model (124) to execute a well-defined (possibly narrow) function and to limit the output to a limited number of tokens. Micro prompts cause the language model (124) to execute in a more computationally efficient matter, relative to other types of prompts which request fuzzy logic, less well-defined functions, or which request a full reasoning or analysis as part of the output of the language model (124).

The data repository (100) also stores a stop condition (116). The stop condition (116) is a predefined contingency which defines, in computer executable program code, when interweaving execution of the regular expressions (112) and the prompts (114) is to stop. Examples of the stop condition (116) are described with respect to FIG. 2.

The data repository (100) also stores a tag (118). The tag (118) is metadata associated with one or more of the regular expressions (112) or one or more of the prompts (114). The tag (118) defines the effect that execution of the regular expressions (112) or the prompts (114) may have on the current pool of the results (104).

For example, the tag (118) may be a "recall safe" tag. A recall safe tag indicates that execution of the corresponding regular expressions (112) or the prompts (114) has zero chance, or a low chance within some predetermined threshold, of filtering true positive results when executed on the current pool of the results (104).

In another example, the tag (118) may define a residual noise. The residual noise represents a predicted percentage of true negatives that will remain in the current pool of the results (104) when the corresponding regular expressions (112) or the prompts (114) are executed. In other words, the residual noise predicts what percentage of the remaining results will be negative results, after the corresponding regex or micro prompt is executed.

Other examples of the tag (118) may exist. The tag (118) may include additional metadata, for example.

Figure 3:
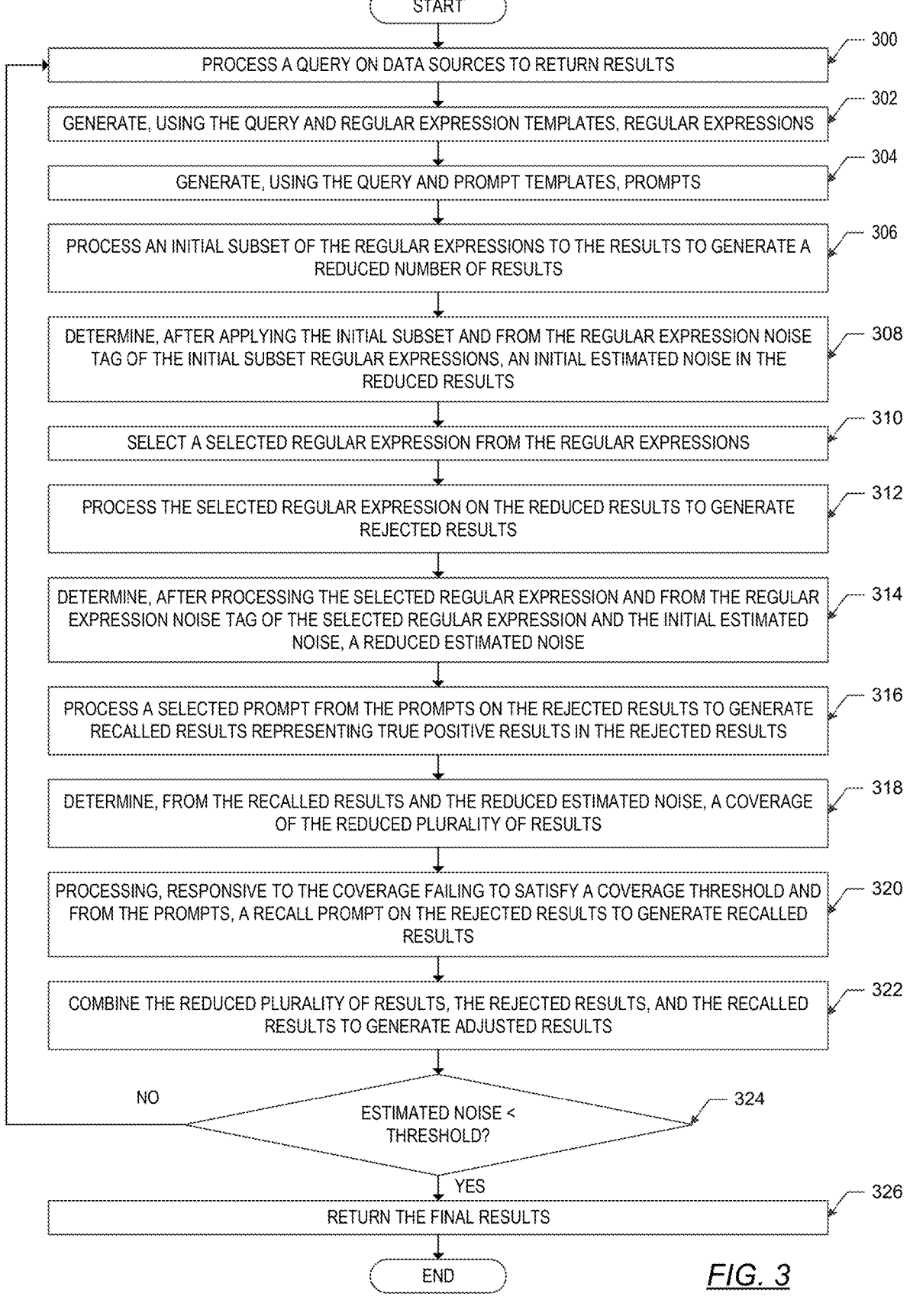

Other information may be tracked or evaluated during execution of the method of FIG. 2 or FIG. 3. For example, during execution of the method of FIG. 3, coverage may be tracked. Coverage is the predicted number of true positives remaining in the current pool of results, relative to the rejected true positives. More formally, let A_true be the accepted true positive results in the current pool of results. Then coverage may be defined as (A_true)/(A_true+T_left).

For regex passes, A_true is the number of accepted items times the difference of one and the residual noise. Let T_left be the rejected true positive results in the current pool of results. For regex passes, T_left is the number of true positive results divided by the number of rejected candidate results, as estimated via random sampling among the rejected results. For recall rescue passes, the number of rescued true positives is the number of rescued results times the difference between one and the residual noise. For recall rescue passes, the A_true is the number of last pass accepted items times the difference of one and the residual last pass noise rate, to which is added the number of rescued true positives less the last pass A_true plus estimated rescues. For recall rescue passes, the T_left is the T_left on the prior pass, less the rescued true positive results, less the last pass true positive results in the rejected population minus the results that were rescued.

In addition, precision may be tracked. Precision is the predicted number of true positives in the current pool of results, relative to the sample size (i.e., the total number of results) in the current pool of results.

In addition, the total number of tokens may be tracked. The total number of tokens is the number of tokens used in each of the prompts (114) that are executed, plus the number of tokens output by the language model (124) during execution of the method of FIG. 2 or FIG. 3.

In addition, confidence may be tracked for each of the regular expressions (112) and prompts (114). Confidence is defined by the value of 1, less the value of a noise tag. In other words, confidence is a prediction of the number of true positives that will remain in the current pool of results when the corresponding regular expressions (112) or prompts (114) are executed during the method of FIG. 2 or FIG. 3.

Use of coverage, precision, and the total number of tokens are described with respect to FIG. 2 and FIG. 3. The terms also apply to the data flow of FIG. 4.

The system shown in FIG. 1 may include other components. For example, the system shown in FIG. 1 also may include a server (120). The server (120) is one or more computer processors, data repositories, communication devices, and supporting hardware and software. The server (120) may be in a distributed computing environment. The server (120) is configured to execute one or more applications, such as the language model (124), the search engine (126), and the server controller (128). An example of a computer system and network that may form the server (120) is described with respect to FIG. 5A and FIG. 5B.

The server (120) includes a computer processor (122). The computer processor (122) is one or more hardware or virtual processors which may execute computer readable program code that defines one or more applications, such as the language model (124), the search engine (126), and the server controller (128). An example of the computer processor (122) is described with respect to the computer processor(s) (502) of FIG. 5A.

The server (120) also hosts a language model (124). The language model (124) is a natural language processing machine learning model. An example of the language model (124) may be a large language model, such as CHATGPT®. However, different language models may be used. Use of the language model (124) is described with respect to FIG. 2, FIG. 3, and FIG. 4.

The server (120) also hosts a search engine (126). The search engine (126) is software or hardware programmed to execute a search on sources of information (e.g., web pages, databases, etc.) The search engine (126) may be a browser-based search engine, a structured language search engine, or some other type of search engine.

The server (120) also may include a server controller (128). The server controller (128) is software or application specific hardware which, when executed by the computer processor (122), controls and coordinates operation of the software or application specific hardware described herein. Thus, the server controller (128) may control and coordinate execution of the language model (124), the search engine (126), and other aspects of one or more embodiments (e.g., the query engine (402), the recall safe regexes (410), the metrics evaluator (414), the recall risk regex (420), the LLM rescue recall (424), and the LLM (426) of FIG. 4).

The system shown in FIG. 1 also may include one or more user devices (130). The user devices (130) are computing systems (e.g., the computing system (500) shown in FIG. 5A) that communicate with the server (120).

The user devices (130) may be considered remote or local. A remote user device is a device operated by a third-party (e.g., an end user of a chatbot) that does not control or operate the system of FIG. 1. Similarly, the organization that controls the other elements of the system of FIG. 1 may not control or operate the remote user device. Thus, a remote user device may not be considered part of the system of FIG. 1.

In contrast, a local user device is a device operated under the control of the organization that controls the other components of the system of FIG. 1. Thus, a local user device may be considered part of the system of FIG. 1.

While FIG. 1 shows a configuration of components, other configurations may be used without departing from the scope of one or more embodiments. For example, various components may be combined to create a single component. As another example, the functionality performed by a single component may be performed by two or more components.

FIG. 2 and FIG. 3 show flowcharts of methods for a computationally efficient search filter, in accordance with one or more embodiments. The methods of FIG. 2 and FIG. 3 may be implemented using the system of FIG. 1 and one or more of the steps may be performed on or received at one or more computer processors.

Attention is first turned to the method of FIG. 2, beginning with step 200. Step 200 includes receiving a number of results to a query. The query (102) may be received from a user (e.g., from one or more of the user devices (130) defined below), or may be received from an executable process that calls the search engine (126) to perform a search on the query (102).

Step 202 includes interweaving execution of regular expressions and prompts on the number of results. Interweaving removes negative results from the number of results. Interweaving continues until a stop condition is satisfied. Interweaving generates, after the stop condition is satisfied, final results including a subset of the number of results including positive results to the query. The regular expressions are executed by a processor. The prompts are processed by a language model being executed by the processor.

Briefly, interweaving involves first executing high confidence regexes on the current pool of results to narrow the initial number of results. Then, tighter regexes are executed. A tighter regex may exclude more negative results, or otherwise may exclude negative results that may not be excluded by the high confidence regexes. However, a tighter regex may have a noise tag that results in an unacceptable confidence score (i.e., a tighter regex may exclude an unacceptable number of true positive results).

Thus, after a tighter regex is executed on the current pool of results, a large language model may be executed on a prompt (either a full prompt or a micro prompt, depending on implementation) to check the current pool of results for any excluded results. If the language model determines that a predetermined number of false negatives (i.e., true positives that were rejected by the tighter regex execution), are present, then a recall pass is instituted.

During a recall pass, the language model (possibly with a full prompt) may execute on only the results rejected by the tighter regex in order to identify the false negative results and add those false negative results back into the current pool of results. Because the number of rejected results may be relatively small, compared to the overall number of results, the overall process remains computationally efficient.

When the coverage, which is measured during each regex filter execution, is less than a coverage threshold, then the language model (or perhaps a lighter weight language model that is more computationally efficient than a full language model) may be executed one or more micro prompts in order to further filter the current pool of results. If the coverage exceeds the coverage threshold, or possibly under other predefined conditions, additional, tighter regexes may be executed after executing the language model one or more micro prompts.

The process continues, with each execution of a regex or a language model on a micro prompt further filtering the current pool of results, while from time to time a recall pass may add false negatives back into the current pool of results. Note that interweaving execution of the regexes and the micro prompts does not necessarily mean interleaving or alternating execution regexes and micro prompts, though interleaving is possible in some implementation-specific examples. Rather, the process of one or more embodiments may execute several regexes first (see, for example, the example of FIG. 4), followed by one or more micro prompts, followed by several more regexes, followed by one or more micro prompts, etc. The determination of when to execute a regex or a micro prompt depends on tracked metrics, as explained further below (and as mentioned in summary above).

While many different regexes may be executed, and while one or more language models may execute many different micro prompts, and while one or more recall passes may be implemented, overall, the process of one or more embodiments is computationally efficient compared to executing a full large language model on the initial set of results. Additionally, by tracking precision, coverage, noise, etc., the overall process may be as accurate, or in some cases more accurate, than executing the full large language model on the initial set of results. Accordingly, one or more embodiments may achieve at least comparable filtering precision as a full large language model, but at significantly less computational expense.

The gain in computational efficiency of one or more embodiments, relative to executing a full large language model, may be as much as 90%, depending on the use case, query, and specific constraints. The gain in computational efficiency may be about 70% in many embodiments, though a 90% gain is possible. Thus, one or more embodiments represent a technical solution to the technical problem of returning high precision, high recall returns in response to a query, but at an increased computational efficiency relative to search techniques that rely on large language models or other search tools that use a similar amount of physical computational resources to execute.

Several examples are now given of interweaving regexes and prompts with respect to step 202. In one example, interweaving includes alternating execution of at least some of the regular expressions and at least some of the prompts. Thus, interweaving may include executing multiple regular expressions, and then multiple prompts; i.e., executing at least some of the regular expressions before executing any of the prompts. Alternatively, regexes and prompts may be intermixed, varying the number of regexes and prompts in relation to each other.

For example, the prompts (114) may command the language model (124) to output a single token that is either a "yes" or a "no." In a highly specific example, one of the prompts (114) may command the language model (124) as follows, where the word "you" refers to the language model: "You are an expert editor. Please analyze the current pool of results and check each result therein to see if any of the results in the current pool of results contain a name ambiguity between the token 'Wed' (as in the abbreviation for the word "Wednesday") and the token 'wed' (as in the noun or verb referring to a word for marriage). Please return a single token as output as either a 'yes' (if the name ambiguity exists in any of the results in the current pool of results) or a 'no' (if the name ambiguity does not exist in any of the results in the current pool of results."

In another example, a micro prompt may request a single answer token for each of the results (104) remaining in the current pool of results. Thus, for example, the prompts (114) may include a micro prompt that requests the language model (124) to analyze each of the results (104) in the current pool of results and to return a "yes" or a "no" token, as appropriate, for each of the results (104) if the language model (124) determines that a given result contains the word "gizmo." The language model (124) then returns a list of "yes" and "no" answers, one per each of the results (104) in the current pool of results. The current pool of results may be filtered accordingly (e.g., filtering those results in the current pool of results which contain, or do not contain, the word "gizmo.")

Additional examples are now provided. In an embodiment, each of the regular expressions may include a regex noise tag. In this case, each of the prompts may include a prompt noise tag. Then, interweaving may further include executing, first, first ones of the regular expressions that includes regex noise tags having a recall safe setting.

Then, may also include executing, second, a second regular expression including a noise tag indicating an estimated remaining noise value after execution of the second regular expression. Then, the method also may include identifying rejected results, from among the number of results that were rejected by executing the second regular expression. The method also may include sampling the rejected results to generate a sampling. The method also may include executing, third, a large language model on the sampling to identify rejected positives. The method also may include determining a coverage from the rejected positives. The method also may include comparing the coverage to a coverage threshold. The method also may include executing, responsive to the coverage failing to satisfy the coverage threshold, a recall rescue pass by executing the large language model on the rejected results to identify rejected true positive results remaining in the rejected results. The method also may include adding the rejected true positive results back into a pool of remaining results.

Interweaving may be continued until the stop condition is satisfied (e.g., at step 204). In yet another example, interweaving further includes executing, second, a micro prompt from among the prompts. The micro prompt includes a noise tag indicating an estimated remaining noise value after execution of the micro prompt. Interweaving then includes identifying rejected results, from among the number of results, that were rejected by executing the micro prompt. Interweaving then includes sampling the rejected results to generate a sampling. Interweaving then includes executing, third, a large language model on the sampling to identify rejected positives. Interweaving then includes determining a coverage from the rejected positives. Interweaving then includes comparing the coverage to a coverage threshold. Interweaving then includes executing, responsive to the coverage failing to satisfy the coverage threshold, a recall rescue pass by executing the large language model on the rejected results to identify rejected true positive results remaining in the rejected results. Interweaving then includes adding the rejected true positive results back into a pool of remaining results.

In yet another example, interweaving includes interweaving a first process and a second process. The first process includes executing a second regular expression including a first noise tag indicating a first estimated remaining noise value after execution of the second regular expression. The first process also includes identifying first rejected results, from among the number of results, that were rejected by executing the second regular expression. The first process also includes sampling the first rejected results to generate a sampling. The first process also includes executing a large language model on the sampling to identify first rejected positives. The first process also includes determining a first coverage from the first rejected positives. The first process also includes comparing the first coverage to a first coverage threshold. The first process also includes executing, responsive to the first coverage failing to satisfy the first coverage threshold, a first recall rescue pass by executing the large language model on the first rejected results to identify first rejected true positive results remaining in the first rejected results. The first process also includes adding the first rejected true positive results back into a pool of remaining results.

The second process in the above example may include executing a micro prompt from among the prompts. The micro prompt includes a second noise tag indicating a second estimated remaining noise value after execution of the micro prompt. The second process also may include identifying second rejected results, from among the number of results, that were rejected by executing the micro prompt. The second process also may include sampling the second rejected results to generate a second sampling. The second process also may include executing the large language model on the second sampling to identify second rejected positives. The second process also may include determining a second coverage from the second rejected positives. The second process also may include comparing the second coverage to a second coverage threshold. The second process also may include executing, responsive to the second coverage failing to satisfy the second coverage threshold, a second recall rescue pass by executing the large language model on the second rejected results to identify second rejected true positive results remaining in the second rejected results. The second process also may include adding the second rejected true positive results back into the pool of remaining results.

Yet another example is now provided. First, a set of templates, including regex templates and LLM micro prompt templates, are provided. The templates may have been benchmarked by humans, or by an automated process, with residual noise and recall safe tags. Then, from a benchmark data set of raw results (500-1,000, a balanced data set, where false positives are greater than X % for statistical significance), humans or an automated process may label which of the results are false positives, or noise. The applicable templates may be executed across the sample results. The results of execution may be compared to known results, or analyzed for errors in filtering the results. From the comparison or analysis, the residual noise associated with each template may be determined. The residual noise for each template is then associated with a given template via a noise tag (or recall safe tag) associated with that template.

Thus, for example, if a template is applied, and there is still 40% noise (i.e., negative results) left in the dataset, that template is assigned a 0.4 residual noise tag. In another example, if a template is applied, and that template does not prune out true positives at all, that template is assigned a recall safe tag. Once each template is associated with a tag, a noise tag or a recall safe tag is associated with each template in the system. The noise tags are used to determine the residual noise for any given application of that template for future datasets, in the method of FIG. 2 or FIG. 3, or in the example workflow of FIG. 4. Specifically, a presumption may be made that when a given filter is applied, then the percentage of false positive results (i.e., negative results) remaining in the current pool of results will be about equal to the residual noise tag of that filter.

If a recall safe tag is associated with a template, then it is known that coverage will not be decreased by that template. Thus, templates having recall safe tags may be applied first to the data set to trim out more noise, and therefore safely reduce any computational complexity that may arise by executing other templates (e.g., micro prompts having noise tags may be more computationally complex than regex prompts). Thus, the residual noise tag associated with the templates may be used to estimate how much noise remains in the current pool of results.

Next, one or more embodiments iteratively apply tighter templates (regexes or micro prompts) which have their residual noise tag as estimators for the amount of noise. For example, a rule based regex may have a 0.2 residual noise tag. In this case, assuming the current pool of results is 60 results, the residual noise may be estimated as being $0.2*60=12$ false positives, and therefore 48 true positives (A_true) are expected to remain in the current pool of results.

Coverage estimates are then performed. First, estimates of A_true and T_left are determined from above definitions. In the first pass, the pass using recall safe tags, we know coverage is about 100% since only recall-safe templates are applied. Afterwards, the population that was rejected for regex passes is sampled, usually at a minimum of five sampled rejects. Sampling may be performed by a language model executing on a prompt which has high precision and low residual noise. If none of the sampled results are true positives that were pruned, estimated coverage is not affected and remains at the previous coverage estimate.

If the random sample pulled an already labeled hit, the previous results may be reused. If there are true positives in the sampled rejects, then one or more embodiments determine the coverage, as defined above. If the coverage is less than the threshold, then a recall rescue pass is executed.

In still another example, a sample algorithm is now provided that describes one possible implementation of interweaving at step 202.

1. For a hit matched by any templates, compute the per-recipe confidence:
  i. conf(Rj)=1−noise_tag(Rj).
2. Regex confidence for the hit=
  i. conf_regex=max_j conf(Rj) (take the strictest or best recipe that matched).
3. If the hit was rescued by a language model executing a judge prompt because coverage was low, then:
  i. If LLM says YES with high confidence, set conf_llm=0.90
  ii. Final confidence=max (conf_regex, conf_llm).
  iii. If LLM says NO, keep confidence=conf_regex (or 0 if it only existed in rejects).

Note that the example provided above is only one possible implementation. Other blending schemes are also possible as shown further with respect to FIG. 3 and FIG. 4.

As shown above, interweaving at step 202 may include many possible variations. However, in all the variations, interweaving includes executing at least one regex and at least one micro prompt. In most variations, multiple regexes and micro prompts are executed in alternating sets.

Continuing the method of FIG. 2, step 204 includes determining whether the stop condition is satisfied. Satisfaction of the stop condition depends on the nature of the stop condition. Multiple stop conditions may be used in combination.

In one example, the stop condition may be the execution of every template (regex or micro prompt). Several additional examples are now provided.

In one example of step 204, the method of FIG. 2 also includes tracking, while interweaving, a total number of tokens used during execution of the prompts. The tokens used include both input to a language model and output by a language model. In the example, satisfying the stop condition includes the total number of tokens exceeding a token threshold.

In another example of step 204, the method further includes tracking, while interweaving, a net remaining noise in a pool of remaining results including the number results, less negative results removed from the number of results. Additionally, the method includes tracking, while interweaving, a current coverage in the pool of remaining results. In this case, satisfying the stop condition includes the net remaining noise being less than a target noise, and also that the current coverage is greater than a predetermined coverage.

Still other stop conditions are possible. Thus, the examples given above do not necessarily limit one or more other embodiments.

Returning to the method of FIG. 2, step 206 includes returning the final results. Returning the final results may be performed by storing the final results in a data repository, displaying the final results in a display device, transmitting the final results to another computing process (e.g., that called the method of FIG. 2), or some other computer-executed action on the final results.

The method of FIG. 2 may be varied. For example, the method also may include generating the regular expressions. The regular expressions may be generated by modifying a number of regular expression templates according to the query. The regular expressions may be programmed to filter the number of results.

In another variation, the method also may include generating the prompts. The prompts may be generated by modifying a number of prompt templates according to the query. The prompts instruct the language model to filter the number of results.

In still another variation, the method may include generating at least one of the regular expressions or at least one of the prompts. Generating may include generating a template for at least one of the regular expressions or at least one of the prompts. Generating also may include applying the template to a test set of results to a test query to determine a predicted remaining noise after applying the template and a predicted safety value representing a likelihood of the template, when executed, filtering a true positive from the test set of results. Generating also may include assigning a noise tag to the template. The noise tag represents the predicted remaining noise. Generating also may include assigning a recall safe tag to one or more of the templates. The recall safe tag represents the likelihood being one percent or less. Generating also may include generating at least one of the regular expressions or at least one of the prompts by modifying the template.

Still other variations are possible. For example, the template may include a prompt template. In the variation, generating at least one of the regular expressions or at least one of the prompts may further include assigning a token output limit of a single token to the prompt template.

Attention is now turned to the method of FIG. 3. The method of FIG. 3 is an implementation-specific example of the method of FIG. 2.

Step 300 includes processing a query on a number of data sources to return a number of results. The query may be processed by a search engine which searches one or more data sources for results (e.g., documents, answers, links, etc.).

Step 302 includes generating, using the query and a number of regular expression templates, a number of regular expressions. Each of the number of regular expression templates includes a regular expression noise tag and a regular expression recall tag. Generating the regex templates may be performed as described above with respect to FIG. 2.

Step 304 includes generating, using the query and a number of prompt templates, a number of prompts. Each of the number of prompt templates includes a prompt noise tag and a prompt recall tag. Generating the prompt templates may be performed as described above with respect to FIG. 2.

Step 306 includes processing an initial subset of the number of regular expressions to the number of results to generate a reduced number of results. The initial subset includes the regular expression recall tag being recall safe. Thus, as described above, recall safe regexes may be executed to reduce the current pool of results, and thereby increase the computational efficiency of templates which may involve the use of more computer resources relative to the recall safe regexes (e.g., a language model executing on one or more of the micro prompts, or complex regexes).

Step 308 includes determining, after applying the initial subset and from the regular expression noise tag of the initial subset of the number of regular expressions, an initial estimated noise in the reduced number of results. The initial estimated noise may be estimated as described above. Briefly, the noise tag associated with the regex noise tag may be used to estimate the initial estimated noise.

Step 310 includes selecting a selected regular expression from the number of regular expressions. The selected regular expression is outside the initial subset (i.e., the selected regex is not a recall safe regex). The regular expression noise tag for the selected regular expression may include a higher permitted noise than the regular expression noise tag in the initial subset (i.e., the selected regex may have less remaining noise after the prior template was executed). The regular expression recall tag for the selected regular expression is less than recall safe. The selected regex may be selected according to a number of standards, such as, for example, first selecting those prompts that have the highest noise but also the highest coverage (i.e., prompts that may result in higher noise, but which are less likely to exclude true positive results).

Step 312 includes processing the selected regular expression on the reduced number of results to generate rejected results that are rejected from the reduced number of results. The selected regex is executed by the computer processor on the current pool of results.

Step 314 includes determining, after processing the selected regular expression and from the regular expression noise tag of the selected regular expression and the initial estimated noise, a reduced estimated noise. The noise is reduced, because the noise is tracked continuously for the current pool of results. Thus, each time a template is executed, the remaining noise may reduce over time.

Step 316 includes processing a selected prompt from the number of prompts on the rejected results to generate recalled results representing true positive results in the rejected results. The selected prompt may be selected to maximize coverage (e.g., a full large language model prompt that may result in low noise and high coverage to exclude true positive results).

Step 318 includes determining, from the recalled results and the reduced estimated noise, a coverage of the reduced number of results. The coverage of the reduced number of results (i.e., the current pool of results) may be determined as described above with respect to FIG. 2.

Step 320 includes processing, responsive to the coverage failing to satisfy a coverage threshold and from the number of prompts, a recall prompt on the rejected results to generate recalled results. In other words, the recall prompt may not be executed if the coverage threshold does satisfy the coverage threshold. In this manner, computational efficiency may be increased if insufficient true positive results (as determined by the coverage) will be returned to the current pool of results. However, when the coverage fails to satisfy the coverage threshold, then the large language model may execute the recall prompt on the rejected results. As a result, the large language model may identify true positive results from within the rejected results. The identified true positive results are rescued (i.e., are placed back into the current pool of results).

While execution of a large language model may be computationally inefficient overall, one or more embodiments may still maintain a computational efficiency of the overall method of FIG. 3 to an acceptable measurable efficiency. Specifically, because the large language model executed on a smaller subset of the current pool of results (e.g., on the rejected results only), the computational efficiency of the overall process may remain within acceptable, predetermined limitations (e.g., as determined by staying within a token limit, as described above).

Step 322 includes combining the reduced number of results, the rejected results, and the recalled results to generate adjusted results. As indicated above, the recalled results (i.e., the rescued results) are added back into the current pool of results. The adjusted results become the new current pool of results.

Step 324 includes determining whether the net estimated noise in the adjusted results (i.e., in the new current pool of adjusted results) is less than a noise threshold value. If not (a "no" determination at step 324), then steps 300 through 322 may be repeated, this time applying a different set of regexes and prompts. The process may continue to iterate, responsive to the reduced estimated noise failing to satisfy a noise threshold. Thus, the process of selecting the selected regular expression, processing the selected regular expression, determining the reduced estimated noise, processing the selected prompt, determining the coverage, processing the recall prompt, and combining may be iterated multiple times.

However, if the estimated noise is less than the threshold at step 324 (a "yes" determination at step 324), then iterating terminates. Thus, iterating terminates when the reduced estimated noise satisfies the noise threshold. Note that the estimated noise being less than a threshold represents an example of a stop condition, as mentioned with respect to FIG. 2.

Step 326 includes returning the final results (i.e., iterating generates final results upon termination of iterating). The final results may be returned as described with respect to step 206 of FIG. 2.

While the various steps in the flowcharts of FIG. 2 and FIG. 3 are presented and described sequentially, at least some of the steps may be executed in different orders, may be combined or omitted, and at least some of the steps may be executed in parallel. Furthermore, the steps may be performed actively or passively.

Figure 4:
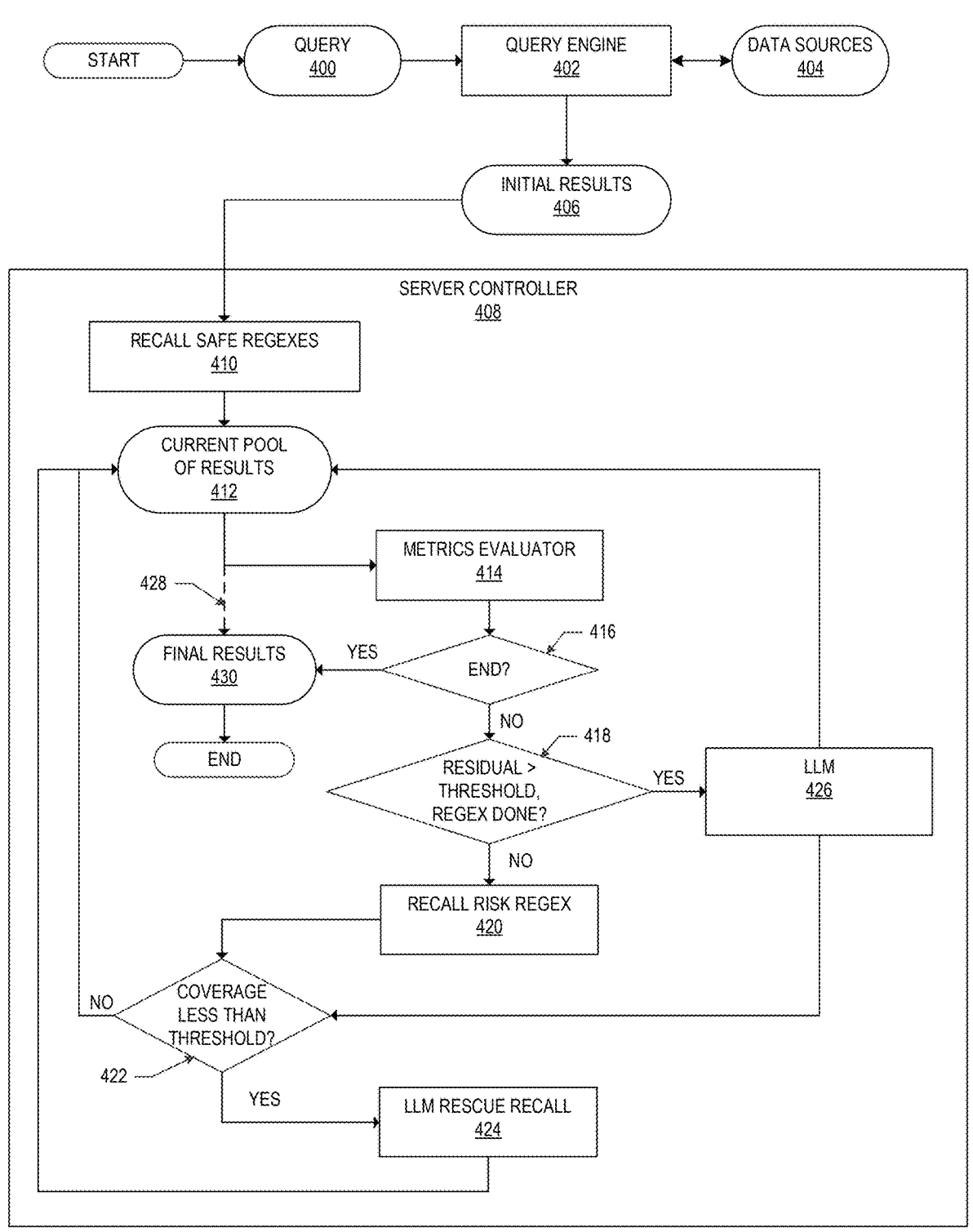
FIG. 4 shows an example of a computationally efficient search filter, in accordance with one or more embodiments.

FIG. 4 shows an example of a computationally efficient search filter, in accordance with one or more embodiments. The following example is for explanatory purposes only and not intended to limit the scope of one or more embodiments. FIG. 4 also may be characterized as a data flow. The data flow shown in FIG. 4 may be a variation of the method of FIG. 2 or of FIG. 3. The data flow shown in FIG. 4 may be implemented using the system of FIG. 1.

In the example, a query (400) is received at a query engine (402). The query (400) may be received from a user device in the example (e.g., a user submitting a search request to a Web search engine). The query engine (402) then returns initial results (406) from one or more data sources (404). In the example, the initial results (406) include twenty million results (i.e., 20,000,000 hits). In the example, executing a large language model to identify the top 5 results among the 20,000,000 hits would be computationally too expensive for the available computing system to handle within a predefined acceptable amount of time.

Thus, the initial results (406) are provided to a server controller (408). The server controller (408) may be the server controller (128) of FIG. 1. The server controller (408), in turn, executes a variation of the method of FIG. 2 on the initial results (406), as described further below, in order to filter the initial results (406) in a computationally efficient manner.

Specifically, the initial results (406) are provided to recall safe regexes (410). The recall safe regexes (410) are executed on the initial results (406). The recall safe regexes (410) identify 10,000,000 of the initial results (406) that are negative results (i.e., not a satisfactory answer to the query (400)). Thus, executing the recall safe regexes (410) reduces the current pool of results (412) to 20,000,000 to 10,000,000 hits. Because the recall safe regexes (410) are known not to strip true positives from the initial results (406), the coverage of the current pool of results (412) immediately after the recall safe regexes (410) is considered to be 100% (i.e., none of the rejected results at this point are considered to be true positives). Nevertheless, it is expected that many true negative results still remain in the current pool of results (412) at this point.

Nevertheless, each of the recall safe regexes (410), being a regular expression, is computationally highly efficient. A modern computer may execute all of the recall safe regexes (410) in a matter of microseconds to perhaps a few seconds, whereas a modern large language model may not have been able to execute on all of the initial results (406) because the large number of results would have exceeded the token limit of the large language model. Furthermore, the large language model would have required an unacceptable amount of time (e.g., days or longer) and physical energy (and therefore money) to execute on so many results. Thus, recall safe regexes (410) efficiently reduced the number of the initial results (406), thereby further increasing the computational efficiency of each subsequent regex or micro prompt described further below.

After execution of the recall safe regexes (410), the current pool of results (412) is provided to a metrics evaluator (414). The metrics evaluator (414) determines the current residual noise (from the residual noise tags of the recall safe regexes (410)) and the coverage (still estimated at 100% because the recall safe regexes (410) were known not to strip true positives from the initial results (406)).

Then an end determination (416) is evaluated. The end condition in the example is either of; 1) the residual noise being below a noise threshold combined with a coverage being above a coverage threshold, or 2) a token limit having been reached. In the example, the residual noise is above the noise threshold, as determined by the metrics evaluator (414), and therefore the first alternative for the end condition is not reached. Furthermore, no tokens have yet been processed by a language model, and therefore the second alternative for the end condition is not reached.

Therefore, due to a "no" determination at end determination (416), the workflow proceeds to a regex determination (418). A determination is made whether the residual noise is above a second noise threshold, and combined with an estimated coverage in the rejected samples. The regex determination (418) is used to determine whether a recall pass should be attempted. In the example, because at this point only the recall safe regexes (410) have been performed, the regex determination (418) determines that the threshold has not been met (i.e., a "no" determination at the regex determination (418)).

Therefore, a recall risk regex (420) is executed on the current pool of results (412). The recall risk regex (420) strips another 5,000,000 results from the current pool of results (412), though the regex in question has a noise tag that indicates a 20% noise rate (i.e., 20% of the 5,000,000 remaining results likely will be true negatives).

Then, a coverage determination (422) is executed. Specifically, a determination is made whether the coverage within the 5,000,000 rejected results is less than a threshold. If not (a "no" determination at coverage determination (422)), then the 5,000,000 remaining results become the new current pool of results (412). If so (a "yes" determination at coverage determination (422)), then an LLM rescue recall (424) is executed on the 5,000,000 rejected results.

The LLM rescue recall (424) execution identifies 1,000,000 of the 5,000,000 rejected results that are true positives. The 1,000,000 results therefore are added back into the current pool of results (412).

Assume, for purposes of the example, that the LLM rescue recall (424) was executed. Therefore, at this point in the example, the current pool of results (412) includes 6,000,000 of the original 20,000,000 results.

Again, the metrics evaluator (414) executes on the current pool of results (412). Assume the end determination (416) is not met, and that the regex determination (418) is once again a negative determination. Thus, another recall risk regex (420) is executed, but this time using a different regex that has a tighter noise requirement, but a higher risk of excluding true positives. After the second recall risk regex (420) execution, 2,000,000 results remain out of the 6,000,000 after the first execution of the recall risk regex (420).

Again, the coverage determination (422) is executed. However, despite the higher risk of excluding true positives, the coverage is determined to be less than the coverage threshold. Thus, the LLM rescue recall (424) is not executed on the current iteration of the example. Accordingly, the current pool of results (412) is now 2,000,000 results.

A third iteration of the workflow is now performed. This time, the metrics evaluator (414) results in a determination that the end determination (416) has not been met. However, at the regex determination (418), a determination is made that the residual noise is greater than a threshold. In the example, regexes are starting to lose their effectiveness, in terms of the computational efficiency of the overall process (in other words, from an overall computational efficiency perspective, the next best filter should be a micro prompt).

Thus, a "yes" determination is reached at the regex determination (418) on the third pass of the iterative process. Accordingly, a large language model is executed on a micro prompt and on the 2,000,00 results in the current pool of results (412). The micro prompt commands the language model to identify aspects of the remaining 2,000,000 results that are difficult, impossible, or computationally inefficient to execute using regexes.

Examples of the micro prompts may, for example, include micro prompts with context injection (dynamically injected information such as title, URL, snippet, expected entity, expected page type, etc.). The specialized micro-tasks may include entity verification (e.g., does a result refer to the target entity versus a namesake), keyword sense disambiguation (e.g., "AI" as company versus a capability), attribution checks (e.g., does the snippet support the title claim), role or event validation (e.g., whether a person is a chief financial officer at a company, identification of acquisition events, etc.), deduplication & canonicalization across sources, etc. The output of each micro prompt is a one-word token (e.g., "yes" or "no") in order to increase computational efficiency.

The LLM (426) executes one or more of the micro prompts. In the example, if the answer to a micro prompt is "yes" (or "no" in some embodiments), then the result associated with that answer is filtered (or retained in some embodiments). Regardless of how the answer to the micro prompt is applied, the LLM (426) identifies that 5,800,000 of the remaining results are negatives. Accordingly, 200,000 results remain.

In the example, the coverage determination (422) is performed again with respect to the effect of the execution of the micro prompt by the LLM (426). In the example, the coverage determination (422) is less than the coverage threshold, and thus a recall pass is performed using the large language model, but this time using a complex prompt that seeks to identify any true positives that remain in the 5,800,000 negative results after application of the micro prompt using the LLM (426). As a result, 100,000 true positives are identified and added back into the current pool of results (412). Thus, the current pool of results (412) is now 300,000 results.

Continuing the example, a fourth pass is performed. This time, the metrics evaluator (414) determines that the end determination (416) has not been met, and then determines that the regex determination (418) also has not been met because a strict regex can now be executed. Thus, a new, different recall risk regex (420) is executed on the current pool of results (412). As a result, only 10,000 results remain because 290,000 negative results are identified. Again, the coverage determination (422) is less than the coverage threshold, so the LLM rescue recall (424) is executed again, returning 5,000 false negatives (i.e., true positives) back into the current pool of results (412). Thus, 15,000 remain in the current pool of results (412).

Continuing the example, a fifth pass is performed. Again, the metrics evaluator (414) determines that the end determination (416) has not been met, and then determines that the regex determination (418) has been met. Thus, a new micro prompt is executed by the LLM (426) on the current pool of results (412). As a result, 10,000 negative results are stripped from the current pool of results (412) and 5,000 results remain. A new LLM rescue recall (424) is executed when the coverage determination (422) is less than the coverage threshold, returning 1,000 true positive results within the rejected subset of results at the fifth pass. As a result, the current pool of results (412) is now 6,000 results.

The process described above continues to be executed, and in the example ten more iterations occur, each one a new micro prompt executed by the LLM (426). Ultimately, in one example, the token limit of the combined executions of the large language model during the overall process is reached when determining the end determination (416), which satisfies one of the stop conditions. At that point, the number of results that remain (e.g., 100 results) is in the current pool of results (412) and then is returned as the final results (430), as indicated by the arrow (428).

Alternatively, in another example, the coverage exceeds an overall coverage threshold at end determination (416), which satisfies one of the stop conditions. In the additional example, 25 results remain in the current pool of results (412), which are returned as the final results (430).

As shown above, the exemplary workflow interweaves the execution of regexes and micro prompts. Initially, multiple regexes are executed (e.g., the recall safe regexes, followed by one or a few noise regexes), but eventually one or more micro prompts are processed by the LLM (426). Then, another regex is executed, followed by multiple micro prompts being processed by the large language model. Thus, the workflow of FIG. 4 demonstrates one example of interweaving the execution of regexes and a large language model processing micro prompts.

The data flow described with respect to FIG. 4 is also computationally efficient, compared to executing the LLM (426) on the original results. The execution of regexes is particularly computationally efficient, compared to the execution of the LLM (426) on a complex prompt. The processing of micro prompts by the LLM (426) is also comparatively computationally efficient.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
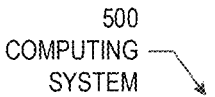
FIG. 5A and FIG. 5B show a computing system and network environment, in accordance with one or more embodiments.
Figure 5A:
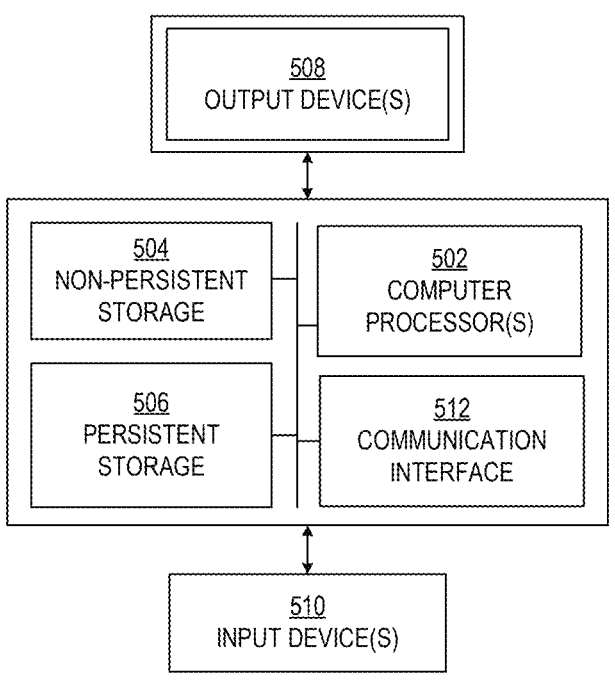

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or microcores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
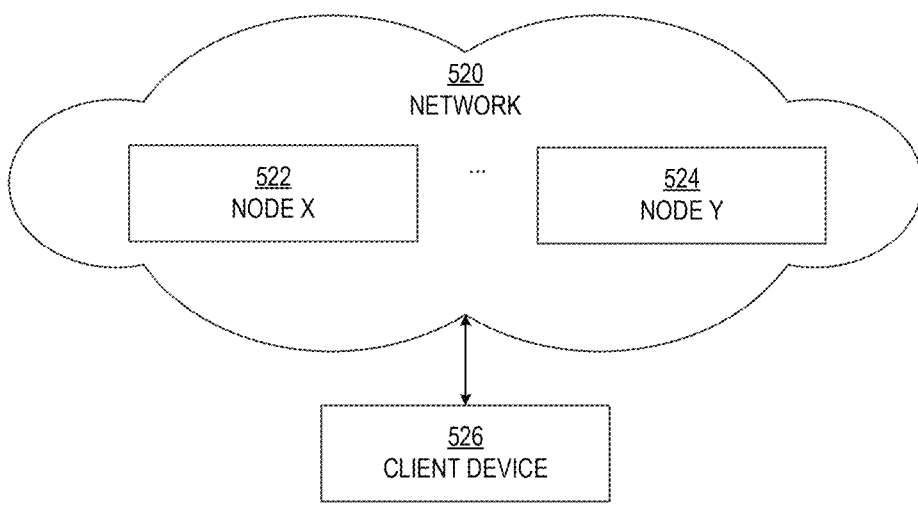

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:
1. A method comprising:
receiving a plurality of results to a query;
generating, from the query, a plurality of regular expressions each comprises a noise tag and a recall tag:
processing an initial subset of the plurality of regular expressions on the plurality of results to generate a reduced plurality of results, wherein the initial subset comprises the regular expression recall tag being recall safe;
determining, from the regular expression noise tag of the initial subset, an estimated remaining noise value in the reduced plurality of results;
interweaving execution of a selected regular expression from the regular expressions outside the initial subset and prompts on the plurality of results to remove negative results and generate a pool of remaining results, wherein the noise tag for the selected regular expression comprises a higher permitted noise than the initial subset and the regular expression recall tag for the selected regular expression is less than recall safe, wherein:
the interweaving continues until a stop condition is satisfied,
identifying the negative results that were removed as rejected results;
determining, from the set of rejected results and based on the noise tags and recall tags, a coverage for the plurality of results, wherein the coverage being a predicted number of true positives remaining in the pool of remaining results;
executing, responsive to the coverage failing to satisfy a coverage threshold, a recall rescue pass by processing a large language model on the set of rejected results to identify recalled results representing true positive results in the rejected results;
adding the rejected true positive results back into the pool of remaining results to generate adjusted results;
determining, after processing the recall rescue pass and based on the estimated remaining noise value, a reduced estimated noise value;

continuing the interweaving and the recall rescue pass until the reduced estimated noise value satisfies a noise threshold; and returning final results comprising the adjusted results from the pool of remaining results as determined upon termination of the interweaving and the recall rescue pass when the reduced estimated noise satisfies the noise threshold.

2. The method of claim 1, further comprising:

generating the regular expressions by modifying a plurality of regular expression templates according to the query, wherein the regular expressions are programmed to filter the plurality of results.

3. The method of claim 1, further comprising:

generating the prompts by modifying a plurality of prompt templates according to the query, wherein the prompts instruct the language model to filter the plurality of results.

4. The method of claim 1, wherein each of the prompts comprises a portion of the plurality of results and a command to check the portion of the plurality of results against a standard.

5. The method of claim 4, wherein the prompts instruct the large language model to return a single answer token.

6. The method of claim 1, wherein the interweaving comprises:

alternating execution of at least some of the regular expressions and at least some of the prompts.

7. The method of claim 1, wherein the interweaving comprises:

executing at least some of the regular expressions before executing any of the prompts.

8. The method of claim 1, wherein:

each of the regular expressions comprises a regex noise tag, and each of the prompts comprises a prompt noise tag.

9. The method of claim 8, wherein the interweaving further comprises:

executing, first, first ones of the regular expressions that comprise regex noise tags having a recall safe setting.

10. The method of claim 9, wherein the interweaving further comprises:

executing, second, a second regular expression comprising regex noise tag indicating the estimated remaining noise value after execution of the second regular expression;

identifying the rejected results, from among the plurality of results, that were rejected by executing the second regular expression;

sampling the rejected results to generate a sampling;

executing, third, the large language model on the sampling to identify the rejected positives.

11. The method of claim 10, further comprising:

continuing the interweaving until the stop condition is satisfied.

12. The method of claim 9, wherein the interweaving further comprises:

executing, second, a micro prompt from among the prompts, wherein the micro prompt comprises a noise tag indicating the estimated remaining noise value after execution of the micro prompt;

identifying the rejected results, from among the plurality of results, that were rejected by executing the micro prompt;

sampling the rejected results to generate a sampling;

executing, third, the large language model on the sampling to identify rejected positives.

13. The method of claim 9, wherein the interweaving comprises:

interweaving a first process and a second process, wherein the first process comprises:

executing a second regular expression comprising a first noise tag indicating a first estimated remaining noise value after execution of the second regular expression;

identifying first rejected results, from among the plurality of results, that were rejected by executing the second regular expression;

sampling the first rejected results to generate a sampling;

executing the large language model on the sampling to identify first rejected positives;

determining a first coverage from the first rejected positives;

comparing the first coverage to a first coverage threshold;

executing, responsive to the first coverage failing to satisfy the first coverage threshold, a first recall rescue pass by executing the large language model on the first rejected results to identify first rejected true positive results remaining in the first rejected results; and adding the first rejected true positive results back into the pool of remaining results; and wherein the second process comprises:

executing a micro prompt from among the prompts, wherein the micro prompt comprises a second noise tag indicating a second estimated remaining noise value after execution of the micro prompt;

identifying second rejected results, from among the plurality of results, that were rejected by executing the micro prompt;

sampling the second rejected results to generate a second sampling;

executing the large language model on the second sampling to identify second rejected positives; determining a second coverage from the second rejected positives;

comparing the second coverage to a second coverage threshold; executing, responsive to the second coverage failing to satisfy the second coverage threshold, a second recall rescue pass by executing the large language model on the second rejected results to identify second rejected true positive results remaining in the second rejected results; and adding the second rejected true positive results back into the pool of remaining results.

14. The method of claim 1, further comprising:

generating at least one of the regular expressions or at least one of the prompts by:

generating a template for the at least one of the regular expressions or the at least one of the prompts, applying the template to a test set of results to a test query to determine a predicted remaining noise after applying the template and a predicted safety value representing a likelihood of the template, when executed, filtering a true positive from the test set of results, assigning a noise tag to the template, wherein the noise tag represents the predicted remaining noise, assigning a recall safe tag to the template, wherein the recall safe tag represents the likelihood being one percent or less, and generating the at least one of the regular expressions or the at least one of the prompts by modifying the template.

15. The method of claim 14, wherein the template comprises a prompt template, and wherein the generating of the at least one of the regular expressions or the at least one of the prompts further comprises assigning a token output limit of a single token to the prompt template.

16. The method of claim 1, wherein the method further comprises:

tracking, while interweaving, a total number of tokens used during execution of the prompts, and wherein the stop condition comprises the total number of tokens exceeding a token threshold.

17. The method of claim 1, wherein the method further comprises:

tracking, while interweaving, a net remaining noise in the pool of remaining results comprising the plurality results less negative results removed from the plurality of results;

tracking, while interweaving, a current coverage in the pool of remaining results, and wherein:

the stop condition comprises the net remaining noise being less than a target noise, and the stop condition further comprises the current coverage being greater than a predetermined coverage.

18. The method of claim 17, wherein the method further comprises:

tracking, while interweaving, a total number of tokens used during execution of the prompts, and wherein the stop condition comprises the total number of tokens exceeding a token threshold.

19. A system comprising:

a computer processor;

a server controller executable by the computer processor to:

receive a plurality of results to a query, generate, from the query, a plurality of regular expressions each comprises a noise tag and a recall tag;

process an initial subset of the plurality of regular expressions on the plurality of results to generate a reduced plurality of results, wherein the initial subset comprises the regular expression recall tag being recall safe;

determine, from the regular expression noise tag of the initial subset, an estimated remaining noise value in the reduced plurality of results;

interweave execution of a selected regular expression from the regular expressions outside the initial subset and prompts on the plurality of results to remove negative results and generate a pool of remaining results, wherein the noise tag for the selected regular expression comprises a higher permitted noise than the initial subset and the regular expression recall tag for the selected regular expression is less than recall safe, wherein:

the interweaving continues until a stop condition is satisfied, and identify the negative results that were removed as rejected results;

determine, from the set of rejected results and based on the noise tags and recall tags, a coverage for the plurality of results, wherein the coverage being a predicted number of true positives remaining in the pool of remaining results;

execute, responsive to the coverage failing to satisfy a coverage threshold, a recall rescue pass by processing a large language model on the set of rejected results to identify recalled results representing true positive results in the rejected results;

add the rejected true positive results back into the pool of remaining results to generate adjusted results;

determine, after processing the recall rescue pass and based on the estimated remaining noise value, a reduced estimated noise value;

continue the interweaving and the recall rescue pass until the reduced estimated noise value satisfies a noise threshold; and return final results comprising the adjusted results from the pool of remaining results as determined upon termination of the interweaving and the recall rescue pass when the reduced estimated noise satisfies the noise threshold.

20. A non-transitory computer-readable medium having stored thereon executable instructions, which when executed by a computer processors, cause the computer processor to implement a method comprising:

processing a query on a plurality of data sources to return a plurality of results;

generating, using the query and a plurality of regular expression templates, a plurality of regular expressions, wherein each of the plurality of regular expression templates comprises a regular expression noise tag and a regular expression recall tag;

generating, using the query and a plurality of prompt templates, a plurality of prompts, wherein each of the plurality of prompt templates comprises a prompt noise tag and a prompt recall tag;

processing an initial subset of the plurality of regular expressions to the plurality of results to generate a reduced plurality of results, wherein the initial subset comprises the regular expression recall tag being recall safe;

determining, after applying the initial subset and from the regular expression noise tag of the initial subset of the plurality of regular expressions, an initial estimated noise in the reduced plurality of results;

selecting a selected regular expression from the plurality of regular expressions, wherein the selected regular expression is outside the initial subset, wherein the regular expression noise tag for the selected regular expression comprises a higher permitted noise than the regular expression noise tag in the initial subset, and wherein the regular expression recall tag for the selected regular expression is less than recall safe;

processing the selected regular expression on the reduced plurality of results to generate rejected results that are removed from the reduced plurality of results;

determining, after processing the selected regular expression and from the regular expression noise tag of the selected regular expression and the initial estimated noise, a reduced estimated noise;

processing a selected prompt from the plurality of prompts on the rejected results to generate recalled results representing true positive results in the rejected results;

determining, from the recalled results and the reduced estimated noise, a coverage of the reduced plurality of results, wherein the coverage being a predicted number of true positives remaining in the reduced plurality of results;

processing, responsive to the coverage failing to satisfy a coverage threshold and from the plurality of prompts, a recall prompt on the rejected results to generate updated recalled results;

combining the reduced plurality of results, the rejected results, and the updated recalled results to generate adjusted results;

iterating, responsive to the reduced estimated noise failing to satisfy a noise threshold, the selecting the selected regular expression, the processing the selected regular expression, the determining the reduced estimated noise, the processing the selected prompt, the determining the coverage, the processing the recall prompt, and the combining, wherein the iterating terminates when the reduced estimated noise satisfies the noise threshold, and wherein the iterating generates final results upon termination of the iterating; and returning the final results comprising the adjusted results upon the termination of the iterating.

* * * * *